US012659082B2

(12) United States Patent　　　　　(10) Patent No.:　US 12,659,082 B2
Khodabandeh et al.　　　　　　　　　(45) Date of Patent:　Jun. 16, 2026

(54) ADAPTIVE NETWORK SYSTEMS AND METHODS FOR IDENTIFYING AND RECOVERING LOST PACKETS

(71) Applicant: Google LLC, Mountain View, CA (US)

(72) Inventors: Hadi Khodabandeh, Irvine, CA (US); Yong Wang, San Jose, CA (US); Tyler Griggs, Mountain View, CA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 18/402,345

(22) Filed: Jan. 2, 2024

(65) Prior Publication Data

US 2025/0219967 A1　Jul. 3, 2025

(51) Int. Cl.
| | |
|---|---|
| *H04L 1/00* | (2006.01) |
| *H04L 1/16* | (2023.01) |
| *H04L 43/0823* | (2022.01) |
| *H04L 43/0829* | (2022.01) |
| *H04L 45/16* | (2022.01) |
| *H04L 45/7459* | (2022.01) |
| *H04L 49/55* | (2022.01) |

(52) U.S. Cl.
CPC .............. *H04L 1/16* (2013.01); *H04L 1/0043* (2013.01); *H04L 1/0052* (2013.01); *H04L 1/0075* (2013.01); *H04L 43/0829* (2013.01); *H04L 43/0847* (2013.01); *H04L 45/16* (2013.01); *H04L 45/7459* (2022.05); *H04L 49/555* (2013.01); *H04L 49/557* (2013.01); *H04L 2001/0093* (2013.01)

(58) Field of Classification Search
CPC ......... G06F 16/901–9027; H04L 1/0001–248; H04L 43/02–55; H04L 45/02–851; H04L 47/10–83; H04L 49/55–557; H04W 28/04–065
See application file for complete search history.

(56) References Cited

U.S. PATENT DOCUMENTS

2023/0113492 A1　4/2023　Destefanis et al.

FOREIGN PATENT DOCUMENTS

| | | |
|---|---|---|
| CN | 111667264 A | 9/2020 |
| CN | 112822077 B | 12/2022 |
| WO | 2023091362 A1 | 5/2023 |

OTHER PUBLICATIONS

Li, et al., LossRadar: Fast Detection of Lost Packets in Data Center Networks, Dec. 12-15, 2016, 15 pages.
Li, et al., Investigation and Implementation of Reliable Multicast Transport Potocols Using ns-2, Spring 2001, 25 pages.
Shen, et al., An Algorithm of Accurate Network Characteristics Measurement for Mobile Wireless Networks, Aug. 17, 2020, 5 pages.

(Continued)

*Primary Examiner* — Timothy J Weidner

(74) *Attorney, Agent, or Firm* — Lerner David LLP

(57) ABSTRACT

The technology generally relates to systems and methods for transmitting data within a network. In accordance with aspects of the disclosure, nodes of the network may be configured to maintain invertible bloom lookup tables (IBLTs) based on received data packets and receive IBLTs from other nodes based on transmitted data packets. The maintained and received IBLTs can vary in size, as needed, so as to sufficiently identify data packets that have been lost in transmission. In addition, nodes within the network can request lost data packets from upstream nodes within the network.

20 Claims, 10 Drawing Sheets

(56)               References Cited

OTHER PUBLICATIONS

Extended European Search Report for European Patent Application No. 25150048.4 dated Jun. 5, 2025. 7 pages.

Chen et al. Robust set reconciliation. Proceedings of the 2014 ACM SIGMOD International Conference on Management of Data, [Online] Jun. 18, 2014 (Jun. 18, 2014), pp. 135-146, New York, NY, USA. Retrieved from the Internet: <https://dl.acm.org/doi/pdf/10.1145/2588555.2610528>.

Mizrahi et al. Invertible Bloom Lookup Tables with Listing Guarantees. Proceedings of the ACM on Measurement and Analysis of Computing Systems, ACMPUB27, New York, NY, USA, vol. 7, No. 3, Dec. 12, 2023 (Dec. 12, 2023), pp. 1-29, DOI: 10.1145/3626792.

Ozisik et al. Graphene: Efficient Interactive Set Reconciliation Applied to Blockchain Propagation. Data Communication, ACM, 2 Penn Plaza, Suite 701 New York, NY 10121-0701 USA, Aug. 19, 2019 (Aug. 19, 2019), pp. 303-317, XP058440083, DOI: 10.1145/3341302.3342082.

Extended European Search Report for European Patent Application No. 25194449.2 dated Dec. 23, 2025. 11 pages.

Nayak et al. A Review on Impact of Bloom Filter on Named Data Networking: The Future Internet Architecture. arxiv.org, Cornell University Library, 201 Olin Library Cornell University Ithaca, NY 14853, Apr. 7, 2020 (Apr. 7, 2020), 107 pages.

100

100

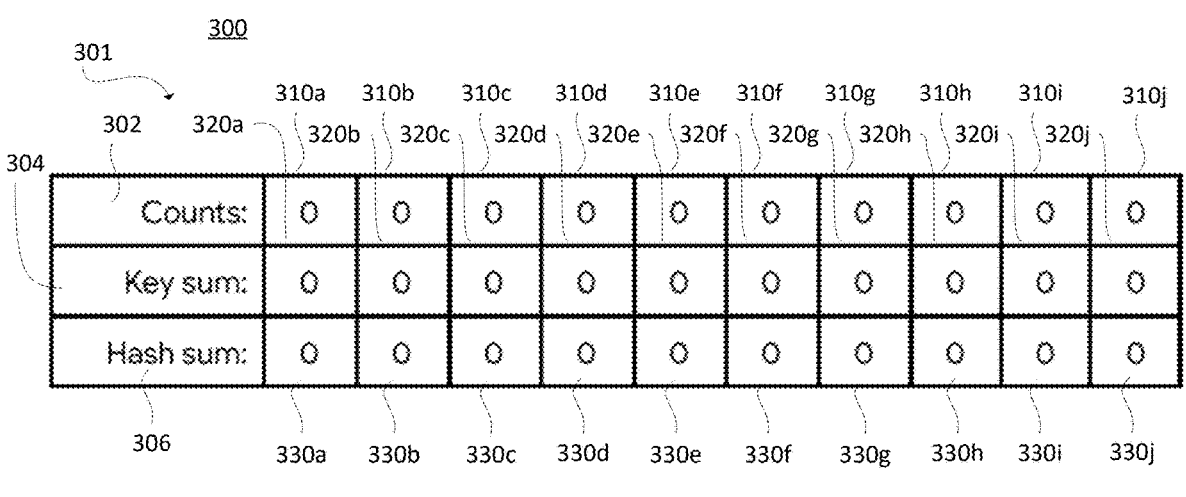
Figure 3
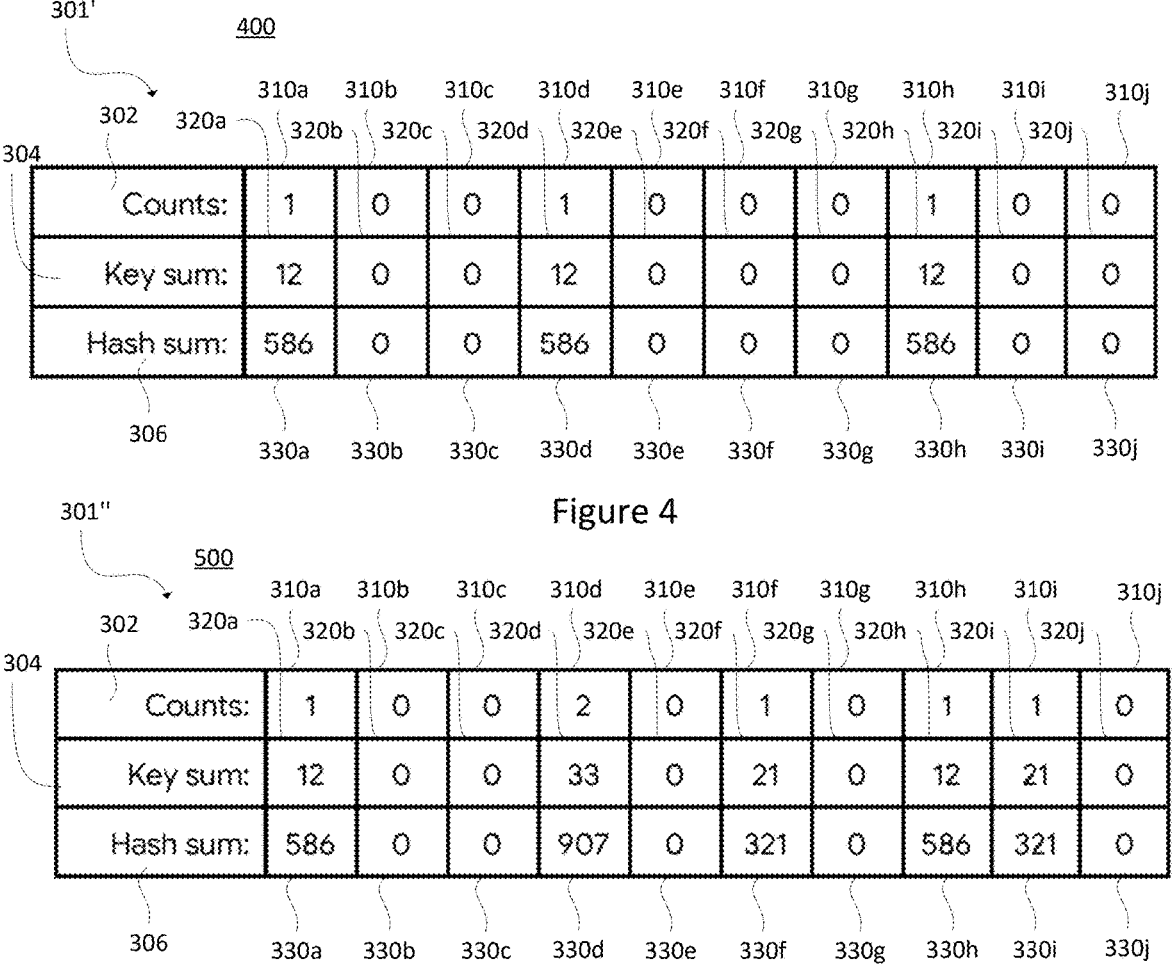
Figure 4
Figure 5

900

1000

1100

1200

ADAPTIVE NETWORK SYSTEMS AND METHODS FOR IDENTIFYING AND RECOVERING LOST PACKETS

Transmission of data over a network can result in packet loss in which one or more nodes fail to receive part of the transmission. For various applications, including multicast networks, it may be desirable for the network to operate with a high degree of reliability, having little to no packet loss. However, even when redundancies are added to the network, the possibility of packet loss can remain. In a typical multicast network, it may be difficult to eliminate a sufficient amount of packet loss, and it can become prohibitive to address specific packet loss within a given transmission.

BRIEF SUMMARY

The disclosure generally relates to systems and methods for transmitting data within a network. Systems and methods are disclosed in which nodes within a network are configured to be able to identify packet loss and can be configured to obtain missing packets from an upstream node. In accordance with aspects of the disclosure, nodes of the network may be configured to maintain invertible bloom lookup tables (IBLTs) based on received data packets and receive IBLTs from other nodes based on transmitted data packets. The maintained and received IBLTs can vary in size, as needed, so as to efficiently identify data packets that have been lost in transmission. In addition, nodes within the network can request lost data packets from neighboring nodes within the network.

In accordance with aspects of the disclosure, a system and method for data transmission may comprise: a plurality of nodes connected via a plurality of data paths, and one or more nodes may be configured to: receive a plurality of data packets corresponding to a data transmission; receive a transmitted invertible bloom lookup table (IBLT) corresponding to the data transmission; compare the transmitted IBLT with a stored IBLT; determine whether the comparison is sufficient to indicate one or more missing packets for the data transmission that were not contained within the plurality of data packets; if the comparison is not sufficient to indicate missing packets, transmit a request for a larger IBLT corresponding to the data transmission; and if the comparison is sufficient to indicate missing packets, identify whether there are missing data packets from the data transmission.

In accordance with other aspects of the disclosure, if the comparison is sufficient to indicate one or more missing packets, the at least one node is further configured to transmit a request to an upstream node for one or more missing packets. If the comparison is not sufficient to indicate the one or more missing packets, the at least one node is further configured to: receive, from another node, the larger IBLT; compare the larger IBLT with a larger stored IBLT having a size corresponding to the larger IBLT; determine whether the comparison of the larger IBLT and the larger stored IBLT is sufficient to indicate one or more missing packets for the data transmission; if the comparison of the larger IBLT and the stored IBLT is sufficient, identify one or more missing packets, and transmit a request for the one or more missing packets.

In accordance with aspects of the disclosure the comparison may comprise taking an element-wise difference between values of the transmitted IBLT and the stored IBLT and performing a peel operation.

In accordance with still other aspects of the disclosure, the at least one node may be further configured to determine whether the transmitted IBLT is larger than needed to indicate missing packets and if so, transmitting a request for a smaller IBLT. In addition, determining whether the transmitted IBLT is larger than needed may include determining whether a difference between the transmitted IBLT and the stored IBLT produces a difference-IBLT that contains a number of empty entries that reaches a predetermined threshold.

In accordance with yet other aspects of the disclosure, the at least one node may be further configured to: receive, from a downstream node, a request to re-transmit a set of one or more data packets; and determine whether the set of one or more data packets are available within a memory. In addition, if the set of one or more data packets is not available within the memory, the at least one node may be further configured to transmit a notification that the set of one or more data packets is no longer available. The at least one node may be a plurality of nodes within a multicast network.

In accordance with yet other aspects of the disclosure, the at least one node may be further configured to: receive, from a downstream node, an IBLT request for an additional IBLT; determine, based on the IBLT request, a size for the additional IBLT; and transmit, to the downstream node, the additional IBLT.

BRIEF DESCRIPTION OF THE DRAWINGS

FIGS. 3-5 are chart diagrams representing IBLTs in accordance with aspects of the disclosure.

DETAILED DESCRIPTION

The transmission of data between nodes within a network can result in the loss of data packets. For example, data packet loss may occur in connection with a buffer within a node reaching a capacity limit, an application not receiving enough CPU cycles, or other forms of data transmission failure. Given the potential for packet loss, a typical multicast protocol may not have sufficient reliability for particular applications, such as a multicast involving financial information or other sensitive data. In accordance with aspects of the disclosure, an additional layer can be used with existing network topology so as to increase the reliability of data transmissions in an efficient manner, and allow for local recovery of lost packets through re-transmission from nearby nodes within the network.

Figure 1:
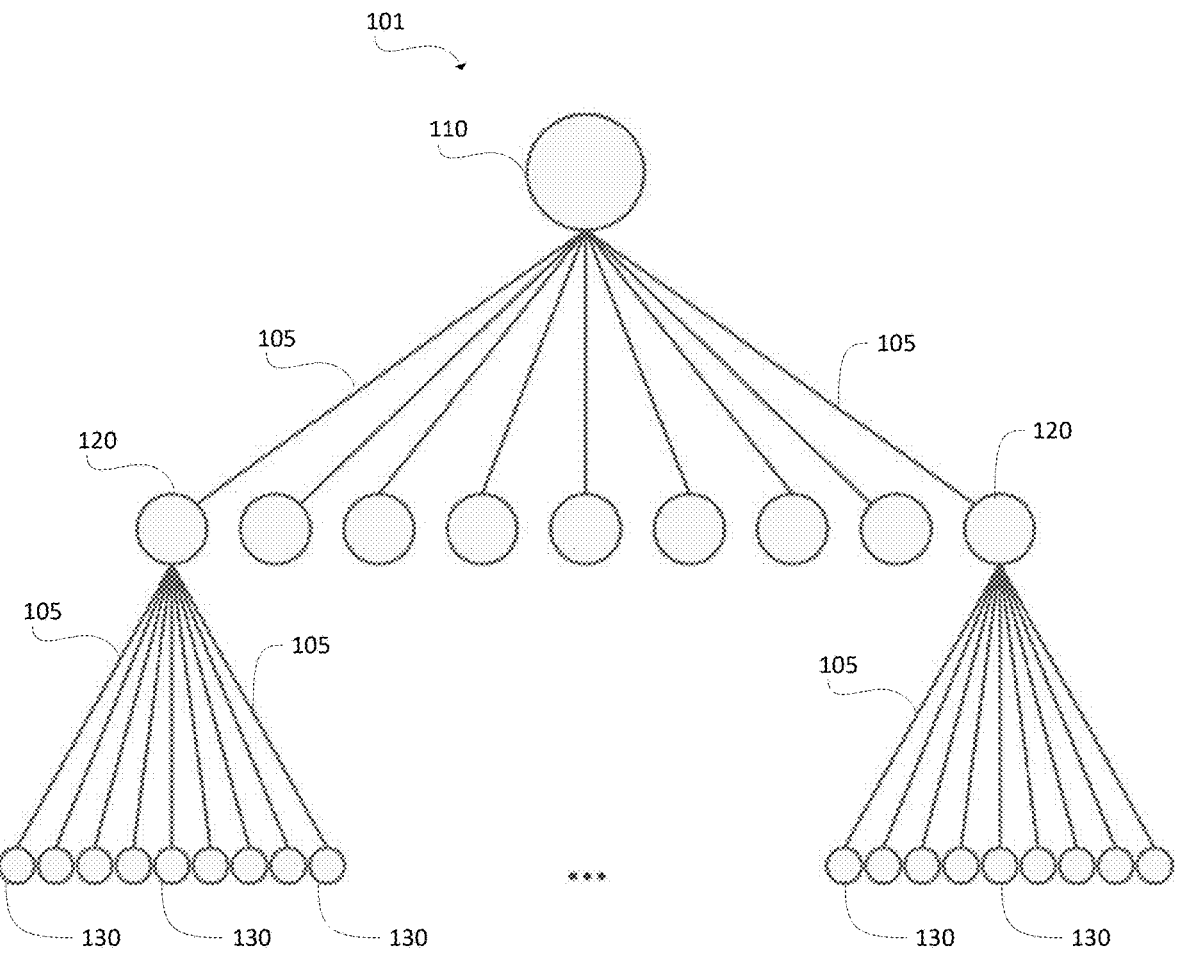
FIG. 1 is a block-diagram of a multicast network having a tree topology.
Figure 2:
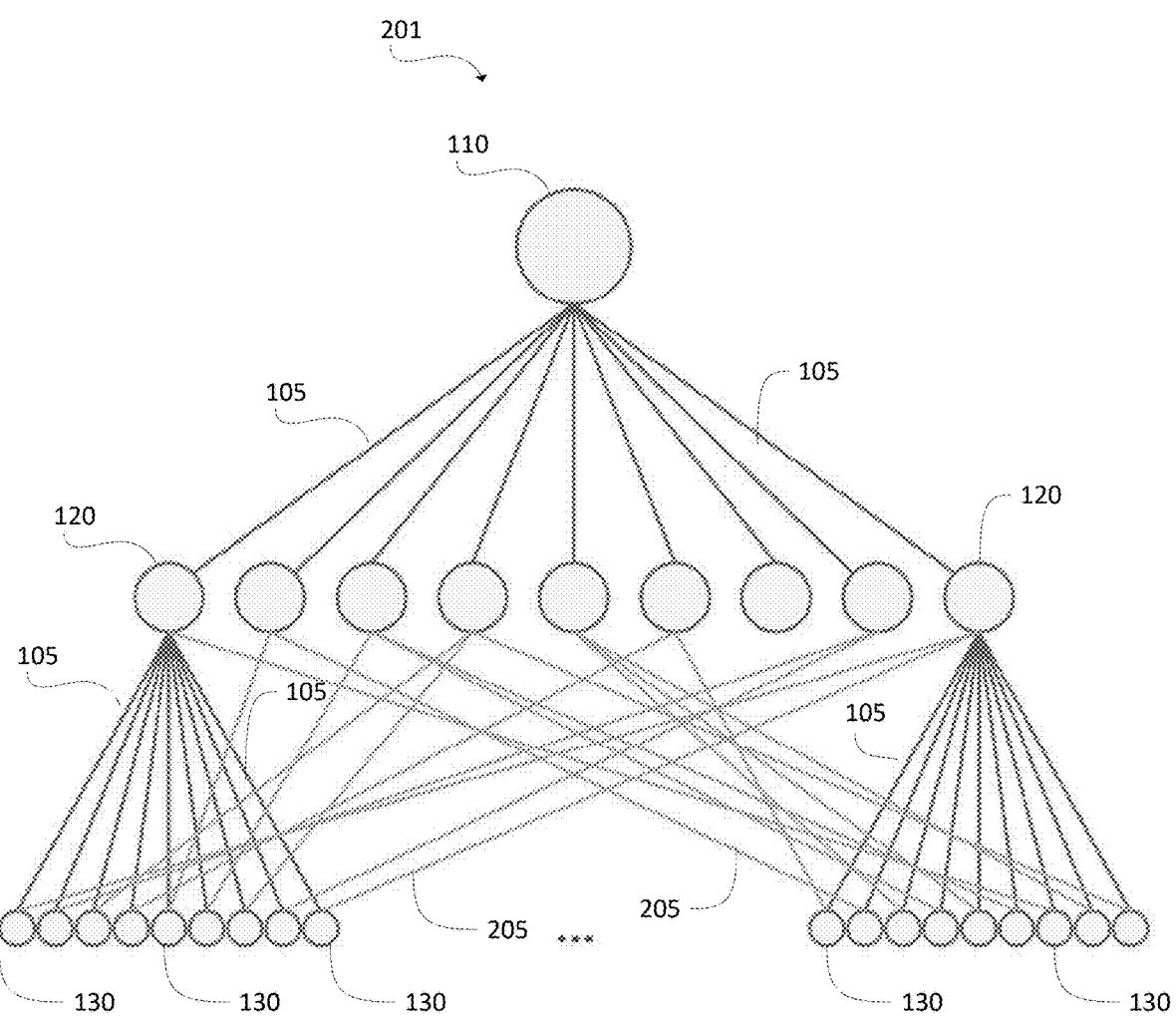
FIG. 2 is a block-diagram of a multicast network having a redundant DAG topology.

FIG. 1 is a diagram 100 of a multicast network 101 that includes a plurality of nodes 110, 120, and 130. Node 110 may act as an originator, or a producing node, in which a message is produced and transmitted via data paths 105 to a plurality of intermediate nodes 120. Having received data packets from node 110, intermediate nodes 120 are configured to further transmit the data packets to downstream nodes 130 within multicast network 101. Nodes 130 may represent final recipients, however the transmission of a message may proceed from an originator node 110 through a plurality of intermediate nodes 120 before reaching a final recipient. For example, downstream nodes 130 may themselves act as intermediate nodes to further downstream nodes (not shown). In addition, downstream nodes may receive data transmissions from more than one node. For example, FIG. 2 is a diagram 200 of a network 201 having a redundant directed acyclic graph (DAG) topology with each downstream node 130 being configured to receive data packets from more than one intermediate node 120 via data paths 105 and 205. Data paths 205 may function so that network 201 acts as a redundant DAG. Nodes 110, 120, 130 may take the form of any computing device, such as a server, that is configured to act as a node within the transmission network 101 or 201. In addition, data paths 105 and 205 may be any form of data transmission, including wireless, electrical, and optical transmissions.

In accordance with aspects of the disclosure, nodes 110, 120, 130 may be configured to transmit and receive invertible bloom lookup tables (IBLTs) in connection with data transmissions. These IBLT can be adaptively sized so as to be sufficiently large enough so that a node 120, 130 is capable of identifying data packets that it has failed to receive. The IBLTs can take the form of a set of tables having entries that are based on the data that is being transmitted from a first node, such as node 120, to a second node, such as node 130. For example, FIG. 3 is a chart 300 of an IBLT 301 in an initial or empty state. IBLT 301 contains a count index 302 that stores a count of the number of elements that have been inserted into each index position 310a-j. A key sum index 304 stores a summation of key values for each index position 320a-j, while a hash sum index 306 stores a summation of hash values at index positions 330a-j. The hash values 330a-j are based on hashes of the keys that have been inserted into each corresponding index position 320a-j.

IBLT 301 contains ten positions for index 302, 304, and 306. Accordingly, IBLT 301 may be referred to as having a size of ten. Each of the ten positions 310a-j for index 302 may be assigned a value from left-to-right of "0" to "9", and a particular data element may be added to each position 310a-j having a corresponding hash value for that particular data element. In addition, each data element may be subjected to multiple hashes in which the data element produces a different result. For example, FIG. 4 is a chart 400 of IBLT 301' in which an element "12" has been added to the IBLT. In adding this data element to IBLT 301', it may be determined that data element "12" has the following three hash values, when three hash operations are performed in connection with the ten available entry values: $h_1(12)=0$, $h_2(12)$ $=3$, $h_3(12)=7$. Accordingly, in IBLT 301', a "12" has been added to the key sum index 304 at positions 320a, 320d, and 320h, which correspond to the 0, 3, and 7 positions within index 304. The count index 302 has also been updated to indicate that a single element has been added to positions associated with entry positions 310a, 310d, and 310h. An additional, a larger hash value for data entry 12, which is not limited to the ten values for index positions, has been calculated to be 586. Accordingly, a "586" is added to hash sum index 306 at index positions 330a, 330d, and 330h. Thus, IBLT 301' has been updated in chart 400 from its initial state, so as to represent that a single data element 12 has been transmitted.

If another data element is transmitted, such as data element 21, then IBLT 301' can be updated so as to represent this second data element. When limited to ten entries, element 21 is determined to produce the following three hash values $h_1(21)=3$, $h_2(21)=5$, $h_3(21)=8$, and is determined to have a larger hash value of 321. Accordingly, IBLT 301' can be updated so that the count, key sum, and hash sum at positions 3, 5 and 8 are updated to represent the transmission of element 21. FIG. 5 is a chart 500 of IBLT 301" that has been updated to represent the transmission of both data elements 12 and 21. As shown in chart 500, count index positions 310f and 310i have been updated to indicate that single element is associated with this index position, while the key sum index positions 320f and 320i have been updated to "21" and hash sum index positions 330f and 330i have been updated to 321. In addition, count index position 310d has been updated to indicate that it now corresponds with two data elements. To this end, key sum index position 320d has been updated to be "33," which represents the addition of 12 and 21, while hash sum index position 330d has been updated to "907," which represents a summation of the hash values 586 and 321. IBLT 301" of chart 500 therefore represents an IBLT for the transmission of data elements 12 and 21.

The data elements that make up an IBLT can be determined in connection with what may be referred to as a peel operation, whereby pure index positions are identified within the IBLT. A pure index position is one that has a count equal to 1, and which has an associated hash sum index value that is equal to the hash value of the key sum value. In peeling an IBLT, a check can be performed to determine that a given index position is indeed pure by determining whether a combination of multiple insertions and removals has not caused an entry position to have an incorrect count of 1, thereby performing false positive prevention. Within IBLT 301", the 0, 5, 7, and 8 index positions are all pure index positions, in that positions 310a, 310f, 310h, and 310i each have a count of 1, and the corresponding positions 320a, 320f, 320h, and 320i represent key sum values that are correct with respect to hash sum values 330a, 330f, 330h, and 330i. Accordingly, these index positions can each be used in connection with a peel operation to identify a particular data packet that is to be a part of the transmission. After identifying a pure entry position, the corresponding key sum index value can be reported in the output and it may be removed from the IBLT as having been verified by the peel operation. Removal of a data element from an IBLT can operate in a similar fashion as insertion, but with the count being decremented, and with the subtraction of the key sum and hash sum values.

When two entities exchange data, a set reconciliation problem exists with respect to confirming that the correct set of data has been received. IBLTs can be used by nodes of a network to address set reconciliation in the face of asymptotically optimal communication complexity. In accordance with aspects of the disclosure, nodes of a network may build large enough IBLTs so as to have sufficient capacity for identifying differences between the transmitting node's set of data and the receiving node's set of data. In many applications, it will not be possible for the nodes to communicate with each to confirm the reception of each data element that has been transmitted, as this would require too much bandwidth and/or introduce too much latency within the transmission. However, IBLT-based set reconciliation protocols disclosed herein can be used to efficiently and quickly reconcile the data sets that are present at the transmitting and receiving nodes.

For a multicast network, nodes within the network receive a stream of data packets that constitutes a growing stream of data, however the differences between the transmitted data packets and the received data packets will be relatively small and may be bounded to a fixed size. Given these small differences, it can be ineffective to use a protocol that merely estimates the difference in the transmitted and received data sets. In particular, a system that has to account for the worst-case scenario will tend to overestimate the size of the differences between what is transmitted and what is received. However, in accordance with aspects of the disclosure, an iterative approach may be implemented in which IBLTs of varying sizes are used depending on feedback that is received in connection with downstream nodes within the network. For example, every node within a network may store a range of IBLTs with different sizes, and each node may update and maintain the IBLTs in connection with each data packet that is received. By using an appropriately-sized IBLT to perform a set reconciliation query, the nodes will be able to identify lost data packets. In addition, by maintaining IBLTs of varying sizes prior to a set reconciliation query, the system requires limited computational overhead in connection with each reconciliation query.

Figure 6:
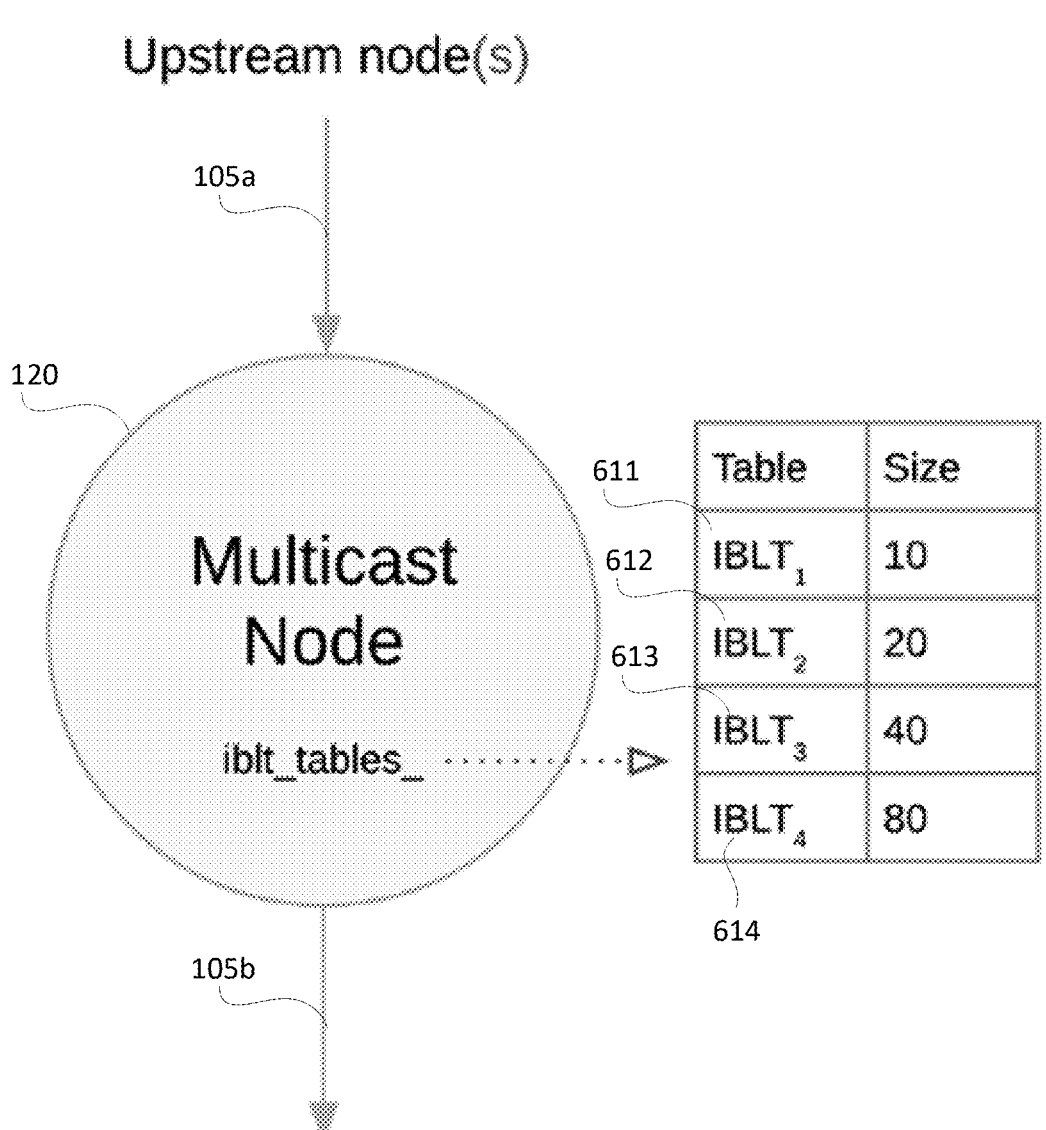
FIG. 6 is a block-diagram of a network node in accordance with aspects of the disclosure.

FIG. 6 is a diagram 600 of a node 120 within a multicast network. Node 120 may receive data packets from one or more upstream nodes via data path 105a. As the data packets are received, node 120 may update and maintain multiple sets of IBLTs 611-614 based on the received data packets. Each IBLT 611-614 is of a different size, in that each contain a different number of index positions. For example, IBLT 611 contains 10 index positions, IBLT 612 contains 20 index positions, IBLT 613 contains 40 index positions, and IBLT 614 contains 80 index positions. In accordance with the disclosure, node 120 may receive an IBLT transmission from an upstream node via data path 105a. The IBLT transmission will include a transmitted IBLT of a particular size and will be based on the set of data that was to be transmitted to node 120. Upon receiving the transmitted IBLT, node 120 may compare the transmitted IBLT with one of the stored IBLTs 611-614 that is of a corresponding size. For example, if the transmitted IBLT is of a size having 10 index positions, node 120 may access stored IBLT 611 and compare IBLT 611 with the transmitted IBLT. This comparison can take the form of finding a difference between the entries within the transmitted IBLT and the stored IBLT 611.

Figure 7:
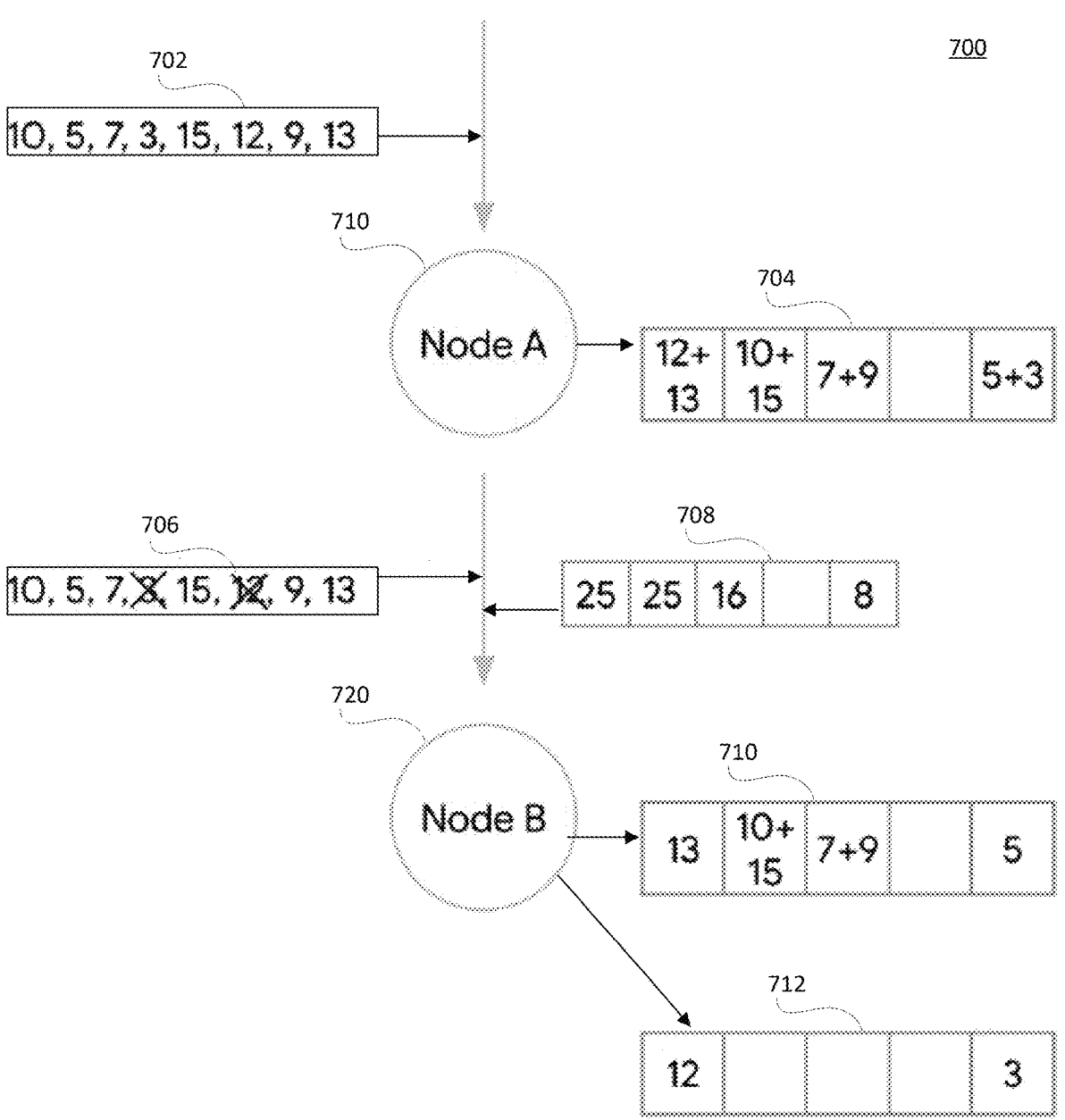
FIG. 7 is a diagram of network node transmissions in accordance with aspects of the disclosure.

If node 120 has received all of the data packets that have been transmitted from the upstream nodes and both IBLTs are correct, then the difference between the transmitted IBLT and the stored IBLT 611 can result in an empty IBLT, in that the transmitted and stored IBLT 611 were each created based on the same data elements that were applied to the same hash functions. However, if node 120 did not receive all of the transmitted data packets that were used to create the transmitted IBLT, then the entries for at least one index position will be non-zero when the difference between the transmitted IBLT and the stored IBLT is taken. For example, FIG. 7 is a block-diagram 700 providing a simplified representation of a portion of an IBLT in which node 710 transmits data to node 720, and node 720 determines a difference between transmitted and stored IBLT values to determine whether data packets have been lost.

In block-diagram 700, node 710 receives packets containing data elements: 10, 5, 7, 3, 15, 12, 9, and 13. These data elements are added to an IBLT, a portion of which is represented as index 704. The addition of these data elements will be at positions within index 704 that correspond with particular hash values for those data elements. Node 710 may transmit the data elements 10, 5, 7, 3, 15, 12, 9, and 13 to node 720, as well as transmitting an IBLT, a portion of which is represented as IBLT 708. In connection with the data transmission between node 710 and node 720, data elements "3" and "12" may be lost, as is represented in the data transmission 706. Accordingly, node 720 will have created an IBLT that is based only on data elements 10, 5, 7, 15, 9, and 13. A portion of the IBLT generated by node 720 is represented as index 710. If node 720 takes the difference between the received index 708 and the generated index 710, it will result in the difference values represented in index 712. Accordingly, node 720 can use the transmitted and stored IBLTs to determine that data elements "3" and "12" were lost during the data transmission.

In accordance with the disclosure, upstream nodes may send one of their IBLTs to all of their downstream nodes, so as to allow for local synchronization of the network. Downstream nodes can use the IBLT that they receive from the upstream node to decode what packets are missing from the data transmission from the upstream node. In addition, the downstream nodes may transmit a request for the missing packets from the upstream node. The upstream node may then respond to these requests by re-transmitting the lost packets to the downstream nodes. The recovery of lost packets from the upstream node can be seen as an IBLT-based local recovery from the "closest hop" within the network.

In identifying lost packets using IBLTs, the size of the transmitted IBLT will need to be sufficiently large so as to allow the receiving node to perform a successful peel operation for the IBLT that results from taking the difference of the transmitted IBLT provided by the upstream node and the stored IBLT that has been generated based on received data packets. A successful peel operation may not be possible for a given IBLT, if for example, the amount of packet loss is too large, thereby resulting in an IBLT that does not result in pure index positions. A peel operation may also fail if an error has been introduced to the transmitted IBLT. In accordance with the disclosed systems and methods, a network can be configured to adaptively size the IBLTs that are transmitted over the network. For example, the network can be configured to minimize the overhead and bandwidth that is used in connection with identifying and recovering lost packets by minimizing the size of the IBLTs that can be used effectively.

In one example, the size of the IBLTs may be determined iteratively based on feedback that is provided by downstream nodes. For example, an upstream node may begin by transmitting the smallest available IBLT to a downstream node. However, if the downstream node is not able to perform a successful peel operation in connection with the smallest IBLT, the downstream node may transmit a request to the upstream node for a larger IBLT. In response to the request, the upstream node may send the next largest IBLT to the downstream node, and this process can be repeated until the downstream node receives an IBLT from the upstream node that is sufficiently large for the downstream node to successfully identify the missing packets. The upstream node may then continue to provide the larger IBLTs for future transmissions.

However, a downstream node may also make a determination whether a transmitted IBLT is larger than needed to perform a successful peel operation. For example, the downstream node may determine that the transmitted IBLT and the stored IBLT results in a difference that is largely empty or is beyond some threshold with regard to empty positions. In this instance, the downstream node may send feedback indicating that a smaller IBLT can be sent in the future. In another example, an upstream node may automatically revert to a smaller IBLT based on other network parameters, such as when the number or bandwidth of the data transmissions goes below a particular threshold. Thus, a network may be configured to efficiently and dynamically alter the sizes of the IBLTs that are transmitted over the network, thereby minimizing the bandwidth and overhead associated with the IBLT-based protocol.

Figure 8:
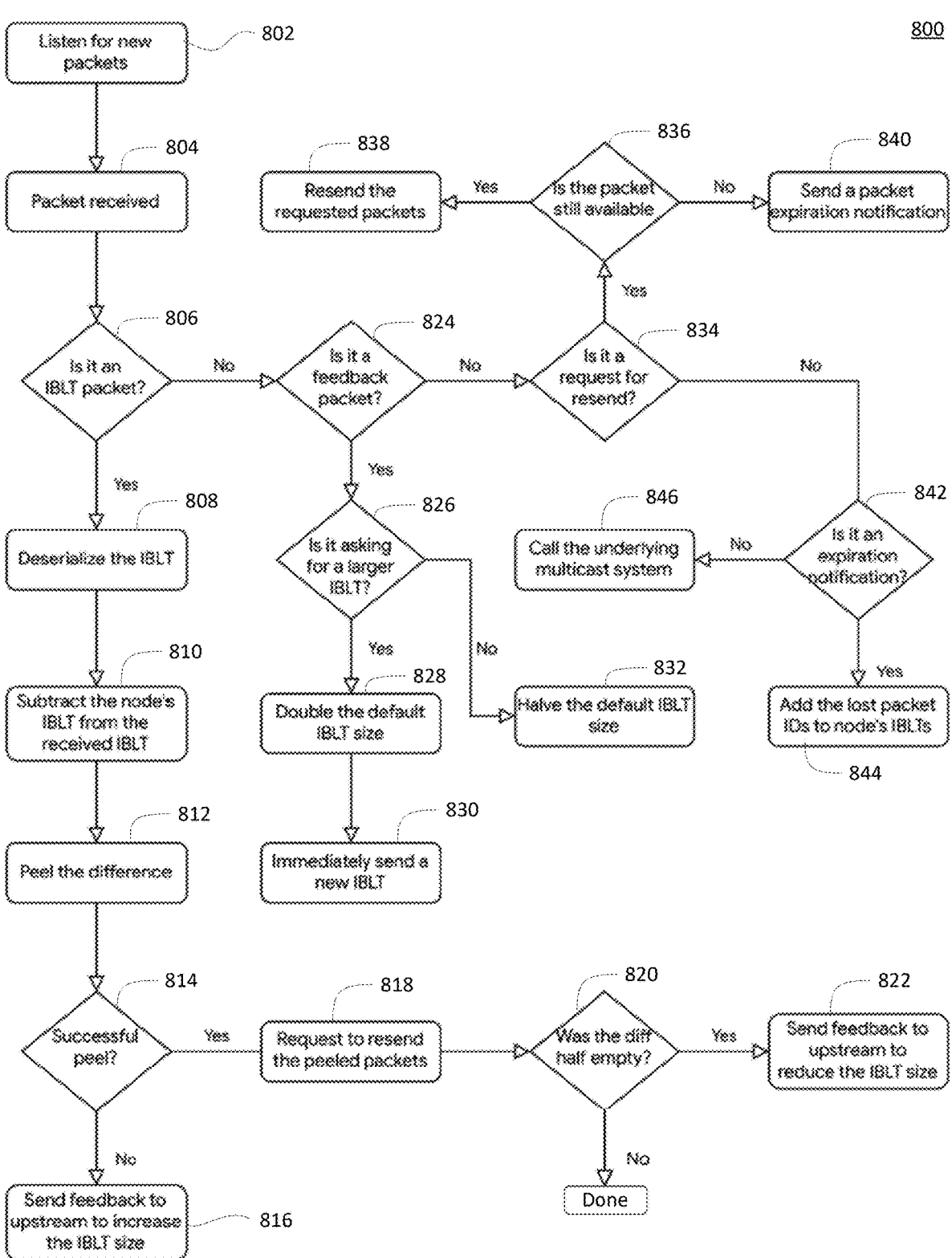
FIG. 8 is a flow-diagram for network operations in accordance with aspects of the disclosure.

FIG. 8 is a flow-diagram 800 for one or more network nodes in accordance with aspects of the disclosure. Operations associated with flow-diagram 800 may be performed by one or more nodes within a multicast protocol network. Each node may be a networked computing device, such a computing router or a networked server having one or more processors with access to electronic memory. While operations within flow-diagram 800 are shown in a particular order, one or more operations may occur in a different order or simultaneously with other operations in accordance with aspects of the disclosure. In addition, one or more operations may be added or removed in accordance with the disclosure.

In block 802, a node may be in a state for which it is listening for new transmission packets from another node within the network. A transmission packet may be received (block 804) and a determination may be made whether the transmission packet is an IBLT packet (block 806). If the transmission is an IBLT packet, the node may deserialize the received IBLT from the transmission packet (block 808) and may take an element-wise difference of a stored IBLT being maintained by the node with the received IBLT from the upstream node (block 810). As discussed herein, the node can be configured to maintain multiple stored IBLTs of varying sizes, with each stored IBLT being based on the data packets that have been previously received. The node will select a stored IBLT that is of the same size as the received IBLT, so that an element-by-element difference between the two IBLTs can be determined. A peel operation is performed on the resulting difference between the two IBLTs (block 812). This peel operation may determine whether pure index positions can be identified within the resulting IBLT difference. If the peel operation is determined to not be successful (block 814)—such as when the IBLT difference is non-zero but no pure index positions are identified—the node may send feedback to the upstream node requesting that a larger IBLT be transmitted (block 816).

If the peel operation is successful (block 814), the node may transmit a request for the packets that were identified as missing within the peel operation (block 818). In block 820, the node may determine whether the IBLT difference contained a certain threshold of empty positions, such as by determining that the IBLT difference was at least half empty. If the empty positions within the IBLT difference is below the threshold, the node can finish the IBLT-related operations and may return data transmission operations, including returning to block 802 in order to listen for additional packets. If the number of empty positions within the IBLT difference is at or above a predetermined threshold, the node may transmit feedback to the upstream node indicating that future IBLTs can be reduced in size (block 822).

Returning to block 806, if the received packet is not an IBLT packet, the node may determine whether the received packet is a feedback packet regarding the size of the IBLT to be transmitted by the node (block 824). If the received packet is a feedback packet, and it is determined that it is a request for a larger IBLT (block 826), the node may increase the default IBLT size that it will transmit, such as by doubling the IBLT size (block 828), and the node may transmit a new, larger IBLT to downstream nodes in response to the received request (block 830). If the request is not for a larger IBLT (block 826), then the node may decrease the default IBLT size, such as by halving the default size for future IBLT transmissions (block 832).

Returning to block 824, if the received packet is not a feedback packet, the node may determine whether the packet is a request for data packets to be retransmitted (block 834). For example, a downstream node may have determined from an IBLT-based analysis that one or more data packets were lost in a previous data transmission, and the downstream node may have transmitted a request that the node re-transmit the lost packets. If it is determined to be a request for re-transmission of data packets, the node may determine whether the requested packets are still available in a memory, such as in a buffer for the node (block 836). If the packets for the requested re-transmission are available in memory, the node may resend the requested packets (block 838), if the requested packets are not available, the nod may respond to the requesting node with an expiration notification, indicating that the requested packets are no longer available for re-transmission (block 840).

Returning to block 834, if the received packet is not a request for re-transmission of data packets, the node may determine if the received packet is an expiration notification from an upstream node (block 842). If it is an expiration notification, the node may add the lost packet IDs to the nodes IBLTs and proceed on from the packet, since the lost packets are no longer available. If the received packets are not an expiration notification (block 842), the node can make a call to the underlying multicast system and proceed with additional data transmissions (block 846).

The system and methods described herein may operate on top of an existing multicast system, such as by adding an IBLT-based layer to provide additional reliability and fast recovery capabilities to the system. The adaptive-size IBLTs can be adjusted according to network characteristics to achieve relatively low bandwidth overhead in connection with the protocol.

Experimental analysis via simulations (e.g., using Network Simulator 3) were performed to measure the effectiveness of potential implementations of adaptive-sized IBLT protocols. Adaptive-sized IBLT protocols were implemented on top of flood protocols and on different network topologies, such as the tree topology shown in diagram 100 of FIG. 1 and the redundant DAG topology shown in diagram 200 of FIG. 2. A first set of simulations were performed for the tree topology of diagram 100 included a single producer node 110, a fan-out of 9 intermediate multicast nodes 120, and 81 consumer nodes 130. The data paths 105 had a 1 Gbps bandwidth, 1 ms delay, and a varying error rate. Specifically, the error rate was varied from 0.1% packet loss to 10% packet loss, with each error rate running as a separate simulation. 1,000 packets were generated and transmitted over network 101 using an IBLT-based protocol, with retransmission, and using a flood protocol without retransmission.

A second set of simulations were performed in connection with redundant DAG topology of FIG. 2, with every consumer node 130 having an additional random upstream node 120 that was connected via a data path 205. The data paths 105, 205 each have a similar bandwidth (1 Gbps), delay (1 ms), and varying error rates as the tree topology described above. Both the IBLT protocol and the flood protocol were tested in connection with 1,000 packets that were generated from the producer node 110 and transmitted to the consumer nodes 130. For each setup, packets were sent in 10 us intervals, and the IBLTs were transmitted on intervals of 500 µs, or approximately once every 50 packets.

Figure 9:
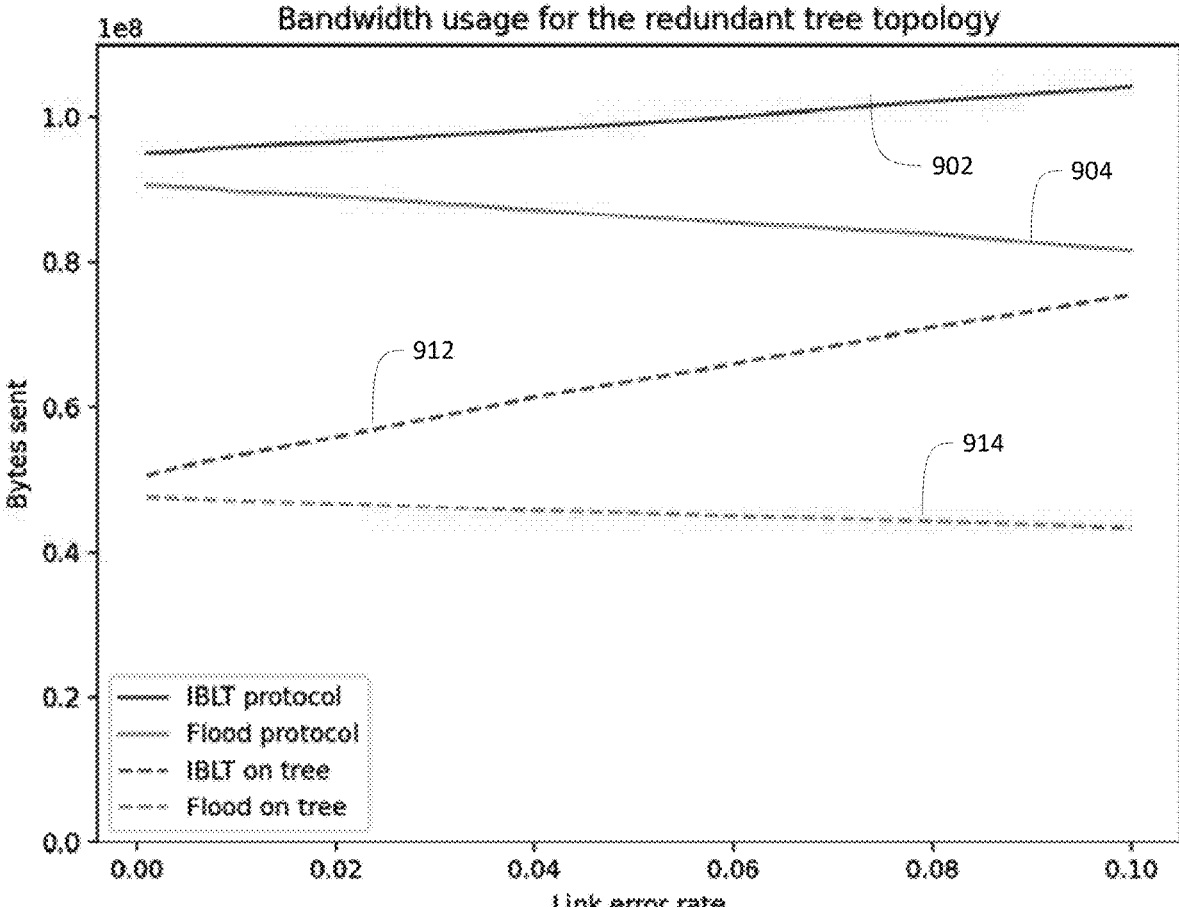
FIGS. 9-12 are graphs of network performance based on IBLT-based and flood protocols.

FIG. 9 is a graph 900 indicating the bandwidth usage (number of bytes transmitted) versus the link error rate for both the redundant and tree topologies when the IBLT protocol and flood protocol were used. Line 902 indicates the observed bandwidth usage for the redundant topology when the IBLT protocol was used, while line 904 indicates that bandwidth usage for the redundant topology when a flood protocol (no retransmission) was used. In addition, line 912 and line 914 represent bandwidth usage for the IBLT and flood protocols, respectively, in connection with the tree topology.

Figure 10:
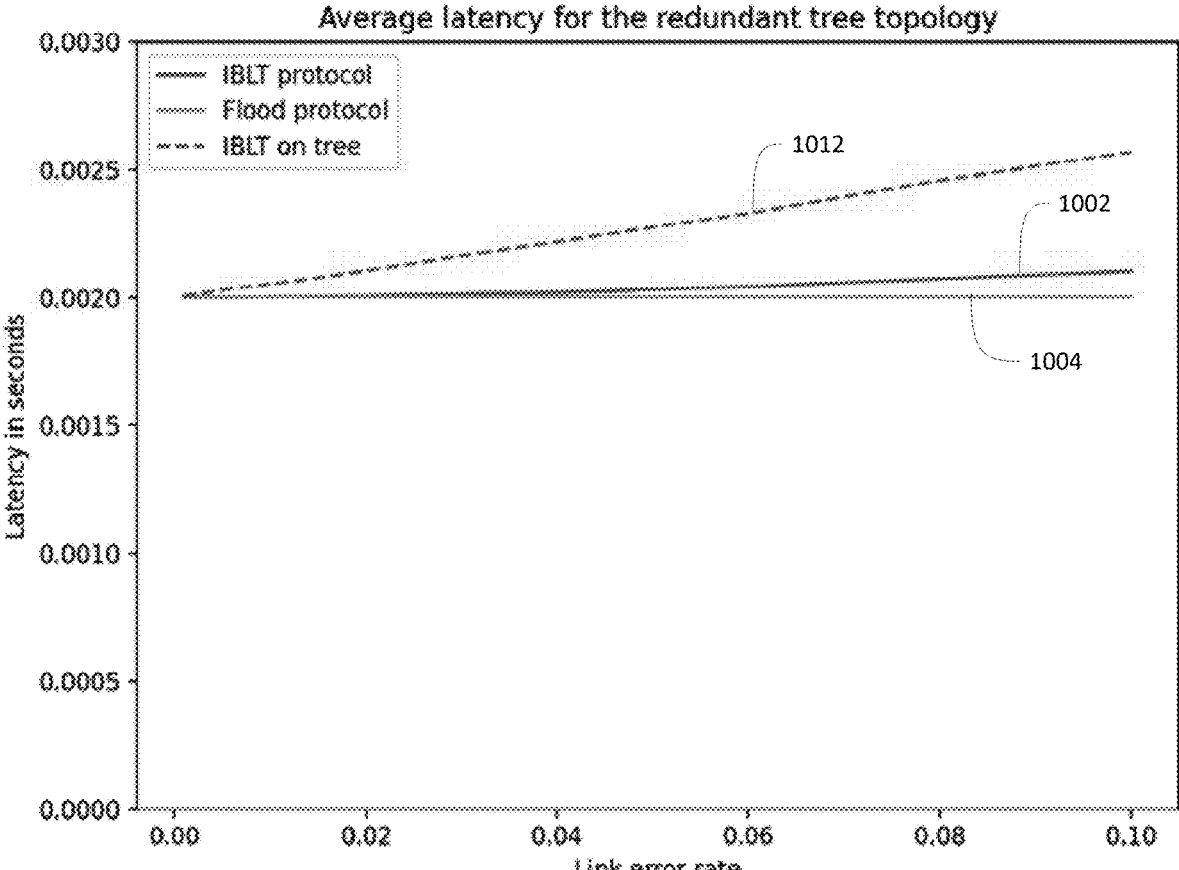

FIG. 10 is a graph 1000 indicating the latency (in seconds) versus the link error rate for IBLT and flood protocols. Line 1002 indicates the observed latency for the redundant topology using the IBLT protocol, while line 1004 indicates the observed latency for the redundant topology using the flood protocol. Line 1012 indicates the observed latency for the IBLT protocol in connection with the tree topology. The average latency of the packets were measured, with latency being based on the time it takes from the moment a packet is generated to the moment the packet is delivered to the consumer node 130. As shown in FIG. 10, the average latency for a flood protocol remains constant, since packets are either delivered in 2 rounds or they are lost and not included in the calculation. The average latency for the IBLT protocol increases with an increase in error rate, due to retransmission of the lost packets. With a 0.1% error rate, the IBLT protocol for the tree topology had a 2.9% higher latency than the flood protocol. For the redundant DAG topology, the flood protocol has the same latency, but the IBLT protocol has a lower average latency for the redundant DAG topology (20× improvement) relative to the IBLT protocol on the tree topology. This is due to fewer packets needing to be retransmitted in connection with the redundant DAG topology.

Figure 11:
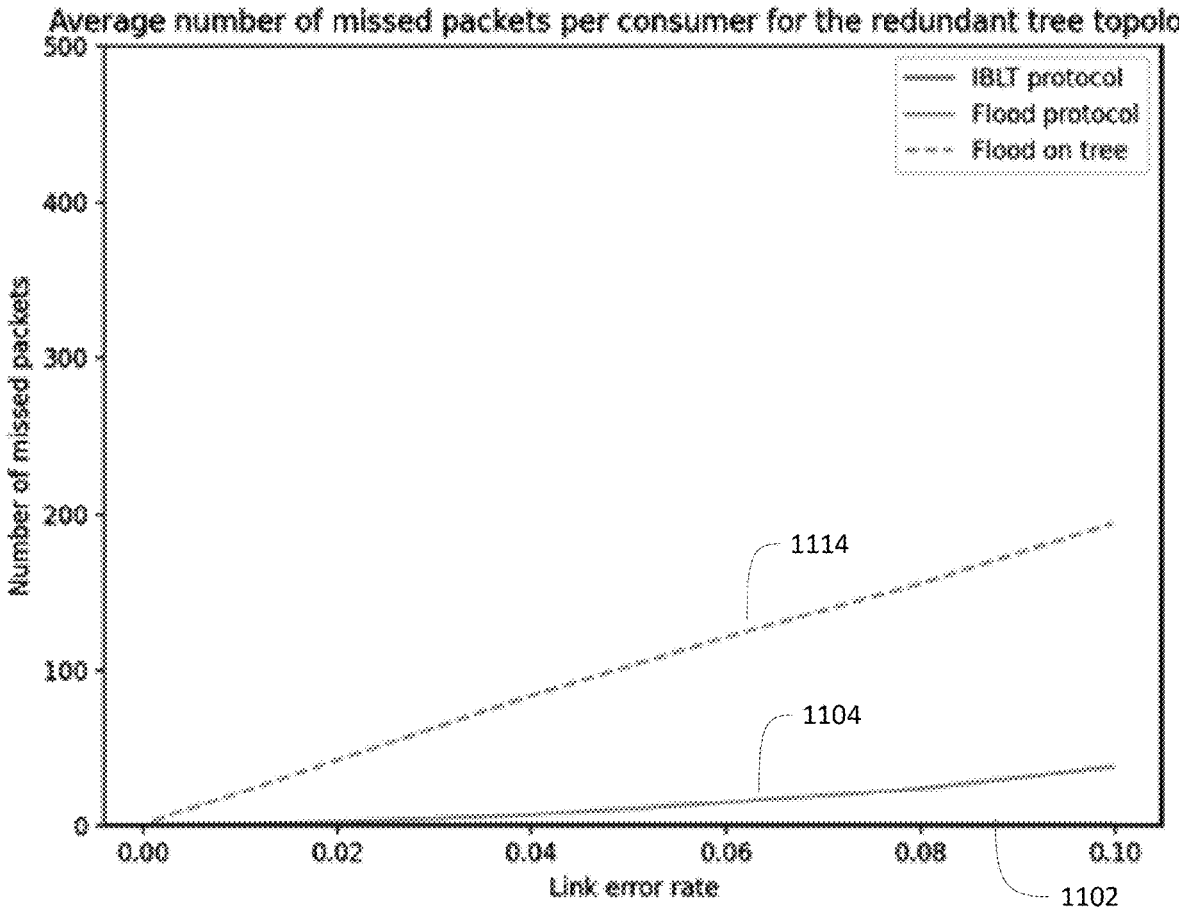

FIG. 11 is a graph 1100 indicating the number of lost packets versus the link error rate. Graph 1100 is based on an average of how many packets were lost for every consumer relative to the error rate. Line 1104 represents the number of lost packets for the flood protocol in the redundant DAG topology, while line 1114 represents the number of lost packets for the flood protocol in the tree topology. The flood-based multicast shows a linear behavior with respect to packet loss, while IBLT-based multicasts successfully recovered all lost packets. Thus, line 1102 coincides with the x-axis, as it represents zero lost packets for the IBLT-based protocol.

Figure 12:
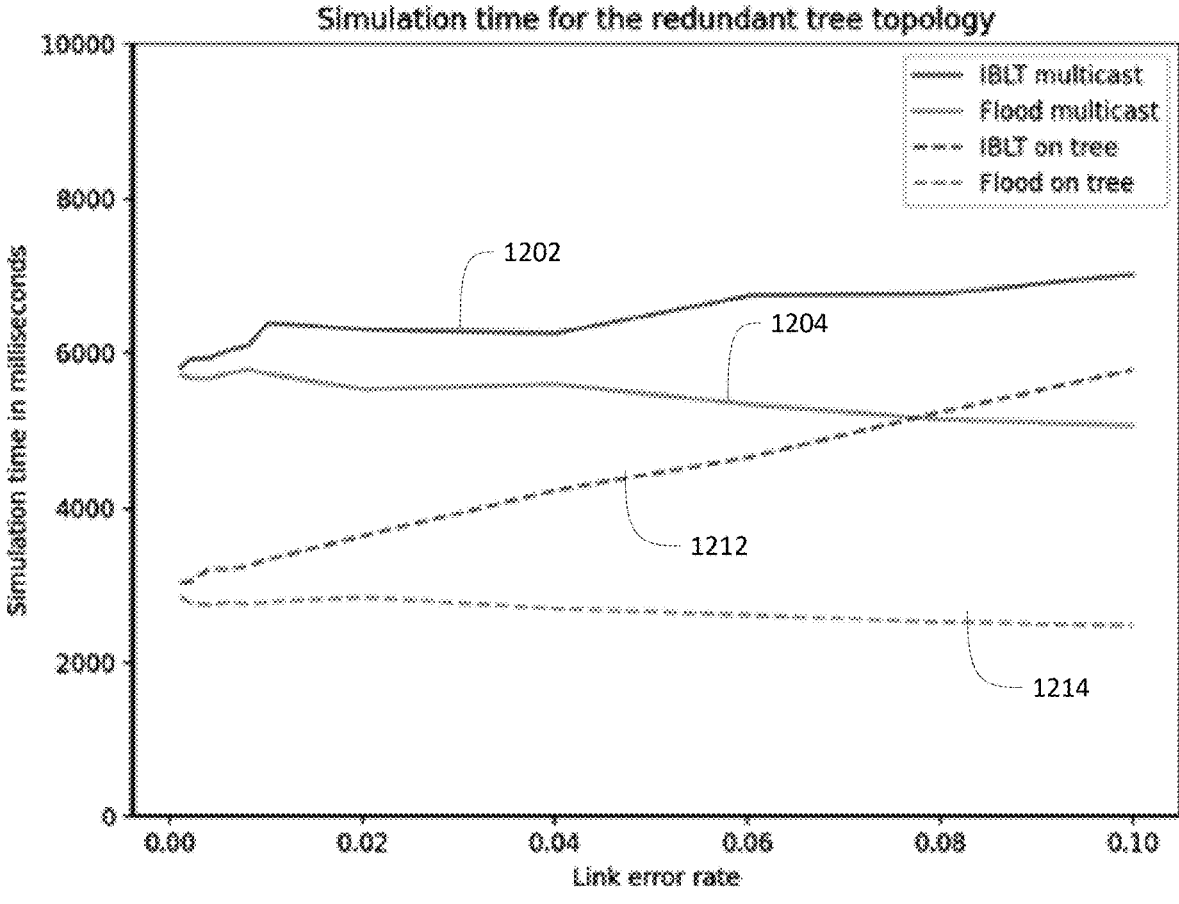

FIG. 12 is a graph 1200 indicating the total simulation time as a measure of total computation versus the error rate. The IBLT protocol is indicated by line 1202 (redundant DAG topology) and line 1212 (tree topology). The flood protocol is indicated by line 1204 (redundant DAG topology) and line 1214 (tree topology). At low error rates, the IBLT-based multicast has about a 6% computational overhead. As the error rate increases, the simulation time increases as well. This is due, in part, to the IBLT protocol having to retransmit additional packets, and taking more simulation time overall.

While the simulations were performed in connection with particular network topologies, the adaptive-sized IBLT protocols described herein may be implemented in various network topologies. In addition, the adaptive-sized IBLT protocols may be implemented in accordance with the network characteristics for bandwidth usage and desired latency, and may be used for multicast applications in which it is desired to have very little to no packet loss.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples. Further, the same reference numbers in different drawings can identify the same or similar elements.

The invention claimed is:

1. A system for data transmission comprising:
a plurality of nodes connected via a plurality of data paths, wherein at least one node is configured to:
receive a plurality of data packets corresponding to a data transmission;
receive a transmitted invertible bloom lookup table (IBLT) corresponding to the data transmission;
compare the transmitted IBLT with a stored IBLT;
determine whether the comparison is sufficient to indicate one or more missing packets for the data transmission that were not contained within the plurality of data packets;
if the comparison is not sufficient to indicate missing packets, transmit a request for a larger IBLT corresponding to the data transmission; and
if the comparison is sufficient to indicate missing packets, identify whether there are missing data packets from the data transmission.

2. The system of claim 1, wherein if the comparison is sufficient to indicate one or more missing packets, the at least one node is further configured to transmit a request to an upstream node for one or more missing packets.

3. The system of claim 1, wherein if the comparison is not sufficient to indicate the one or more missing packets, the at least one node is further configured to:
receive, from another node, the larger IBLT;
compare the larger IBLT with a larger stored IBLT having a size corresponding to the larger IBLT;
determine whether the comparison of the larger IBLT and the larger stored IBLT is sufficient to indicate one or more missing packets for the data transmission;
if the comparison of the larger IBLT and the stored IBLT is sufficient, identify one or more missing packets, and transmit a request for the one or more missing packets.

4. The system of claim 1, wherein the comparison further comprises taking an element-wise difference between values of the transmitted IBLT and the stored IBLT and performing a peel operation.

5. The system of claim 1, wherein the at least one node is further configured to determine whether the transmitted IBLT is larger than needed to indicate missing packets and if so, transmitting a request for a smaller IBLT.

6. The system of claim 5, wherein determining whether the transmitted IBLT is larger than needed comprises determining whether a difference between the transmitted IBLT and the stored IBLT produces a difference-IBLT that contains a number of empty entries that reaches a predetermined threshold.

7. The system of claim 1, wherein the at least one node is further configured to:
receive, from a downstream node, a request to re-transmit a set of one or more data packets; and determine whether the set of one or more data packets are available within a memory for retransmission.

8. The system of claim 7, wherein if the set of one or more data packets is not available within the memory, the at least one node is further configured to transmit a notification that the set of one or more data packets is no longer available.

9. The system of claim 1, wherein the at least one node is a plurality of nodes within a multicast network.

10. The system of claim 1, wherein the at least one node is further configured to:

receive, from a downstream node, an IBLT request for an additional IBLT;

determine, based on the IBLT request, a size for the additional IBLT; and transmit, to the downstream node, the additional IBLT.

11. A method for data transmission comprising:

receiving, by a network node, a plurality of data packets corresponding to a data transmission;

receiving, by the network node, a transmitted invertible bloom lookup table (IBLT) corresponding to the data transmission;

comparing the transmitted IBLT with a stored IBLT;

determining whether the comparison is sufficient to indicate missing packets for the data transmission that are not contained within the plurality of data packets;

if the comparison is not sufficient to indicate missing packets, transmitting a request for a larger IBLT corresponding to the data transmission; and if the comparison is sufficient to indicate missing packets, identifying whether there are missing data packets from the data transmission.

12. The method of claim 11, wherein if the comparison is sufficient to indicate missing packets, the method further comprises transmitting a request to an upstream node for one or more missing packets.

13. The method of claim 11, wherein if the comparison is not sufficient to indicate missing packet, the method further comprises:

receiving, from another node, the larger IBLT;

comparing the larger IBLT with a larger stored IBLT having a size corresponding to the larger IBLT;

determining whether the comparison of the larger IBLT and the larger stored IBLT is sufficient to indicate missing packets for the data transmission;

if the comparison of the larger IBLT and the stored IBLT is sufficient, identifying one or more missing packets, and transmitting a request for the one or more missing packets.

14. The method of claim 11, wherein the comparison further comprises taking an element-wise difference between values of the transmitted IBLT and the stored IBLT and performing a peel operation.

15. The method of claim 11, further comprising determining whether the transmitted IBLT is larger than needed to indicate missing packets and if so, transmitting a request for a smaller IBLT.

16. The method of claim 15, wherein determining whether the transmitted IBLT is larger than needed comprises determining whether a difference between the transmitted IBLT and the stored IBLT produces a difference-IBLT that contains a number of empty entries that reaches a predetermined threshold.

17. The method of claim 11, further comprising:

receiving, from a downstream node, a request to retransmit a set of one or more data packets; and determining whether the set of one or more data packets are available within a memory for retransmission.

18. The method of claim 17, wherein if the set of one or more data packets is not available within the memory, transmitting a notification that the set of one or more data packets is no longer available.

19. The method of claim 11, wherein the plurality of data packets are transmitted within a multicast network.

20. The method of claim 11, further comprising:

receiving, from a downstream node, an IBLT request for an additional IBLT;

determining, based on the IBLT request, a size for the additional IBLT; and transmitting, to the downstream node, the additional IBLT.

* * * * *